(12) United States Patent
Kubota (10) Patent No.: US 12,519,123 B2
(45) Date of Patent: Jan. 6, 2026

(54) METHOD AND APPARATUS FOR MANUFACTURING LAMINATED ELECTRODE BODY

(71) Applicant: Prime Planet Energy & Solutions, Inc., Tokyo (JP)

(72) Inventor: Seiko Kubota, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 820 days.

(21) Appl. No.: 17/565,376

(22) Filed: Dec. 29, 2021

(65) Prior Publication Data

US 2022/0216499 A1    Jul. 7, 2022

(30) Foreign Application Priority Data

Jan. 5, 2021    (JP) .................................. 2021-000511

(51) Int. Cl.
*H01M 10/04* (2006.01)

(52) U.S. Cl.
CPC .................................. *H01M 10/04* (2013.01)

(58) Field of Classification Search
CPC .. H01M 10/04; H01M 10/0404; H01M 50/46; B25J 15/0616
See application file for complete search history.

(56) References Cited

U.S. PATENT DOCUMENTS

| | | | |
|---|---|---|---|
| 2013/0216879 A1 | 8/2013 | Egawa et al. | |
| 2013/0251495 A1 | 9/2013 | Hohenthanner et al. | |
| 2014/0020235 A1 | 1/2014 | Aramaki et al. | |
| 2014/0026400 A1* | 1/2014 | Yuhara | B29C 66/433 29/730 |
| 2015/0069109 A1* | 3/2015 | Mori | H01M 10/0436 156/379.7 |
| 2019/0165424 A1 | 5/2019 | Aritomo et al. | |
| 2020/0067051 A1 | 2/2020 | Yamashita et al. | |
| 2020/0152944 A1* | 5/2020 | Sumita | B25J 9/0096 |

FOREIGN PATENT DOCUMENTS

| | | |
|---|---|---|
| CN | 103029029 A | 4/2013 |
| CN | 109478677 A | 3/2019 |
| CN | 110915047 A | 3/2020 |
| DE | 102010050745 A1 | 5/2012 |
| EP | 2696421 A1 | 2/2014 |
| EP | 2717374 A1 | 4/2014 |
| JP | H11-70486 A | 3/1999 |
| JP | 2006172808 A | 6/2006 |
| JP | 20101146 A | 1/2010 |
| JP | 2010257861 A | 11/2010 |
| JP | 201148912 A | 3/2011 |
| JP | 2012-174388 A | 9/2012 |

(Continued)

*Primary Examiner* — Allison Bourke
*Assistant Examiner* — Kayla Elaine Clary
(74) *Attorney, Agent, or Firm* — HAUPTMAN HAM, LLP (57) ABSTRACT

A manufacturing technique of a laminated electrode body which enables a highly accurate laminated electrode body to be manufactured is provided. In a preferable aspect of the manufacturing apparatus of a laminated electrode body disclosed herein comprises a laminating table, transporting means, an inspecting portion, and a control portion. The control portion is configured to execute process disclosed herein.

3 Claims, 7 Drawing Sheets

(56) References Cited

FOREIGN PATENT DOCUMENTS

| JP | 2012-227129 A | | 11/2012 |
|---|---|---|---|
| JP | 2012227125 A | | 11/2012 |
| JP | 2013143213 A | * | 7/2013 |
| JP | 2013171733 A | | 9/2013 |
| JP | 2015146232 A | | 8/2015 |
| JP | 2015176699 A | | 10/2015 |
| JP | 2018116807 A | | 7/2018 |
| JP | 2019-38674 A | | 3/2019 |
| JP | 2019102215 A | | 6/2019 |
| JP | 2019-139961 A | | 8/2019 |
| JP | 2020-197408 A | | 12/2020 |
| WO | 2018154776 A1 | | 8/2018 |

* cited by examiner

METHOD AND APPARATUS FOR MANUFACTURING LAMINATED ELECTRODE BODY

CROSS REFERENCE TO RELATED APPLICATIONS

The present application claims priority on the basis of Japanese Patent Application No. 2021-000511 filed in Japan on Jan. 5, 2021, the entire contents of which are incorporated herein by reference.

BACKGROUND

The present disclosure relates to a method and an apparatus for manufacturing a laminated electrode body.

In recent years, secondary batteries such as lithium ion secondary batteries and nickel hydride batteries are growing in importance as vehicle-mounted power supplies for vehicles using electricity as a drive source and as power supplies to be mounted to electrical appliances including personal computers and mobile phones. In particular, since lithium ion secondary batteries are lightweight and produce high energy density, they are preferable as high-output power supplies for driving vehicles such as a battery electrical vehicle (BEV), a plug-in hybrid electric vehicle (PHEV), and a hybrid electric vehicle (HEV) and demand for lithium secondary ion batteries is expected to increase into the future.

An aspect of such batteries is a battery including a laminated electrode body in which a positive electrode sheet and a negative electrode sheet are laminated in plurality via a separator sheet. The laminated electrode body is typically manufactured by individually causing the positive electrode sheet, the negative electrode sheet, and the separator sheet to be adsorbed by an adsorbing portion and transported to a laminating table, and sequentially laminated on top of each other. For example, Japanese Patent Application Publication No. 2018-116807 and Japanese Patent Application Publication No. 2015-176699 disclose a laminating apparatus including members for performing the step described above.

SUMMARY

In recent years, in order to produce the batteries with higher accuracy, there is a need for improving accuracy of an electrode body included in the batteries. For example, in order to satisfy this need in a laminated electrode body, conceivably, it is necessary to perform lamination while controlling positions of the positive electrode sheet, the negative electrode sheet, and the separator sheet with high accuracy. However, with conventional techniques, since the positive electrode sheet, the negative electrode sheet, and the separator sheet are caused to be individually adsorbed by an adsorbing portion and transported to a laminating table, it is difficult to control the position of each sheet with high accuracy in an aspect of a laminate.

The present disclosure has been made in consideration of the circumstances described above and a main object thereof is to provide a method and an apparatus for manufacturing a laminated electrode body which enable a highly accurate laminated electrode body to be manufactured.

In order to realize the object described above, the present disclosure provides a manufacturing apparatus which manufactures a laminated electrode body in which a positive electrode sheet and a negative electrode sheet are laminated in plurality via a separator sheet.

The manufacturing apparatus includes: a laminating table on which the positive electrode sheet, the negative electrode sheet, and the separator sheet are to be laminated; transporting means which transports sheets to the laminating table and which includes a drivable adsorbing portion having an adsorption plate; an inspecting portion which acquires, from a direction opposing the surface of the adsorption plate, relative positional information between the separator sheet in a state of being adsorbed by the adsorption plate and the positive electrode sheet or the negative electrode sheet in a state of being adsorbed by the adsorption plate; and a control portion for controlling the inspecting portion and the transporting means. In addition, the control portion is configured to execute any of 1) to 3) below:

1) A selective first electrode sheet arrangement process including: causing a separator sheet to be adsorbed at a prescribed position on a surface of the adsorption plate; causing a first electrode sheet made of any of the positive/negative electrode sheets to be adsorbed at a prescribed position on a surface of the adsorbed separator sheet; acquiring, from a direction opposing the surface of the adsorption plate, relative positional information of the separator sheet and the first electrode sheet in a state of being adsorbed by the adsorption plate and inspecting whether or not the acquired positional information indicates a normal positional relationship determined in advance; and arranging the separator sheet and the first electrode sheet in a state of being adsorbed by the adsorption plate on a prescribed laminating table when the normal positional relationship is indicated but not arranging the separator sheet and the first electrode sheet in a state of being adsorbed by the adsorption plate on the laminating table when the normal positional relationship is not indicated; and a selective second electrode sheet arrangement process of performing the selective first electrode sheet arrangement process with respect to the separator sheet and a second electrode sheet, which is a counter electrode of the first electrode sheet, wherein the selective first electrode sheet arrangement process and the selective second electrode sheet arrangement process are alternately repetitively performed until the number of laminations determined in advance of the positive/negative electrode sheets is reached;

2) A first electrode sheet arrangement process including: causing a first separator sheet to be adsorbed at a prescribed position on a surface of the adsorption plate; causing a first electrode sheet made of any of the positive/negative electrode sheets to be adsorbed at a prescribed position on a surface of the adsorbed first separator sheet; causing a second separator sheet to be adsorbed at a prescribed position on a surface of the adsorbed first electrode sheet; and arranging, on a prescribed laminating table, a 3-ply sheet made up of the first separator sheet, the first electrode sheet, and the second separator sheet in a state of being adsorbed; and a second electrode sheet arrangement process including: causing a second electrode sheet, which is a counter electrode of the first electrode sheet to be adsorbed at a prescribed position on a surface of the adsorption plate; and arranging the second electrode sheet in a state of being adsorbed on a laminate obtained after the first electrode sheet arrangement process, wherein the first electrode sheet arrangement process and the second electrode sheet arrangement process are alternately repetitively performed until the number of laminations determined in advance of the positive/negative electrode sheets is reached; and 3) Repetitively performing a 4-ply sheet arrangement process including: causing a first separator sheet to be adsorbed at a prescribed position on a surface of the adsorption plate; causing a first electrode sheet made of any of the positive/negative electrode sheets to be adsorbed at a prescribed position on a surface of the adsorbed first separator sheet; causing a second separator sheet to be adsorbed at a prescribed position on a surface of the adsorbed first electrode sheet; causing a second electrode sheet, which is a counter electrode of the first electrode sheet to be adsorbed at a prescribed position on a surface of the adsorbed second separator sheet; and arranging, on a prescribed laminating table, a 4-ply sheet made up of the first separator sheet, the first electrode sheet, the second separator sheet, and the second electrode sheet in a state of being adsorbed, wherein the 4-ply sheet arrangement step is repetitively performed until the number of laminations determined in advance of the positive/negative electrode sheets is reached.

According to the manufacturing apparatus of a laminated electrode body including the control portion described above, a laminated electrode body in which a position of each sheet is controlled with high accuracy in an aspect of a laminate can be manufactured.

In addition, as another aspect, the present disclosure provides a manufacturing method of a laminated electrode body in which a positive electrode sheet and a negative electrode sheet are laminated in plurality via a separator sheet.

A first manufacturing method disclosed herein includes: a selective first electrode sheet arrangement step (first 2-ply sheet arrangement step) including: separator adsorption processing of causing a separator sheet to be adsorbed at a prescribed position on a surface of an adsorption plate; first electrode sheet adsorption processing of causing a first electrode sheet made of any of the positive/negative electrode sheets to be adsorbed at a prescribed position on a surface of the adsorbed separator sheet; electrode adsorption position inspection processing of acquiring, from a direction opposing the surface of the adsorption plate, relative positional information of the separator sheet and the first electrode sheet in a state of being adsorbed by the adsorption plate and inspecting whether or not the acquired positional information indicates a normal positional relationship determined in advance; and first electrode sheet selection processing of arranging the separator sheet and the first electrode sheet in a state of being adsorbed by the adsorption plate on a prescribed laminating table when the normal positional relationship is indicated in the electrode adsorption position inspection processing but not arranging the separator sheet and the first electrode sheet in a state of being adsorbed by the adsorption plate on the laminating table when the normal positional relationship is not indicated, and a selective second electrode sheet arrangement step (second 2-ply sheet arrangement step) of performing each processing step of the selective first electrode sheet arrangement step with respect to the separator sheet and a second electrode sheet, which is a counter electrode of the first electrode sheet, wherein the selective first electrode sheet arrangement step and the selective second electrode sheet arrangement step are alternately repetitively performed until the number of laminations determined in advance of the positive/negative electrode sheets is reached.

According to the manufacturing method of a laminated electrode body configured as described above, a relative positional relationship between the separator sheet and the positive electrode sheet (or the negative electrode sheet) is checked in a stage prior to lamination and only those of which the relative positional relationship is considered normal are laminated. Accordingly, a laminated electrode body in which a position of each sheet is controlled with high accuracy in an aspect of a laminate can be manufactured.

A second manufacturing method disclosed herein includes: a first electrode sheet arrangement step including: first separator adsorption processing of causing a first separator sheet to be adsorbed at a prescribed position on a surface of an adsorption plate; first electrode sheet adsorption processing of causing a first electrode sheet made of any of the positive/negative electrode sheets to be adsorbed at a prescribed position on a surface of the adsorbed first separator sheet; second separator adsorption processing of causing a second separator sheet to be adsorbed at a prescribed position on a surface of the adsorbed first electrode sheet; and 3-ply sheet arrangement processing of arranging, on a prescribed laminating table, a 3-ply sheet made up of the first separator sheet, the first electrode sheet, and the second separator sheet in a state of being adsorbed; and a second electrode sheet arrangement step including: second electrode sheet adsorption processing of causing a second electrode sheet, which is a counter electrode of the first electrode sheet to be adsorbed at a prescribed position on a surface of the adsorption plate; and electrode sheet arrangement processing of arranging the second electrode sheet in a state of being adsorbed on a laminate obtained after the first electrode sheet arrangement step, wherein the first electrode sheet arrangement step and the second electrode sheet arrangement step are alternately repetitively performed until the number of laminations determined in advance of the positive/negative electrode sheets is reached.

According to the manufacturing method of a laminated electrode body configured as described above, lamination can be performed in a state where a relative positional relationship between the separator sheet, the positive electrode sheet (or the negative electrode sheet), and the separator sheet is maintained. Accordingly, a laminated electrode body in which a position of each sheet is controlled with high accuracy in an aspect of a laminate can be manufactured.

A third manufacturing method disclosed herein comprising a 4-ply sheet arrangement step including: first separator adsorption processing of causing a first separator sheet to be adsorbed at a prescribed position on a surface of an adsorption plate; first electrode sheet adsorption processing of causing a first electrode sheet made of any of the positive/negative electrode sheets to be adsorbed at a prescribed position on a surface of the adsorbed first separator sheet; second separator adsorption processing of causing a second separator sheet to be adsorbed at a prescribed position on a surface of the adsorbed first electrode sheet; second electrode sheet adsorption processing of causing a second electrode sheet, which is a counter electrode of the first electrode sheet to be adsorbed at a prescribed position on a surface of the adsorbed second separator sheet; and 4-ply sheet arrangement processing of arranging, on a prescribed laminating table, a 4-ply sheet made up of the first separator sheet, the first electrode sheet, the second separator sheet, and the second electrode sheet in a state of being adsorbed, wherein the 4-ply sheet arrangement step is repetitively performed until the number of laminations determined in advance of the positive/negative electrode sheets is reached.

According to the manufacturing method of a laminated electrode body configured as described above, lamination can be performed in a state where a relative positional relationship between the separator sheet, the positive electrode sheet (or the negative electrode sheet), the separator sheet, and the negative electrode sheet (or the positive electrode sheet) is maintained. Accordingly, a laminated electrode body in which a position of each sheet is controlled with high accuracy in an aspect of a laminate can be manufactured.

In a preferable aspect of the manufacturing method of a laminated electrode body disclosed herein, in the electrode adsorption position inspection processing, the relative positional information is acquired based on a surface image of the adsorption plate having been photographed by a camera arranged in the opposing direction.

A surface image of the adsorption plate having been photographed by a camera is preferable because the relative positional information can be acquired in a state of higher accuracy.

In a preferable aspect of the manufacturing method of a laminated electrode body disclosed herein, the first electrode sheet, the second electrode sheet, and the separator sheet all have rectangular shapes, and in the electrode adsorption position inspection processing, relative positional information between four corners of the separator sheet in a state of being adsorbed on the adsorption plate and four corners of the first electrode sheet or the second electrode sheet in a state of being adsorbed on the adsorption plate is acquired.

When the first electrode sheet, the second electrode sheet, and the separator sheet have rectangular shapes, such acquisition of positional information is effective.

In a preferable aspect of the manufacturing method of a laminated electrode body disclosed herein, the adsorption plate is a porous adsorption plate.

Using a porous adsorption plate as the adsorption plate is preferable because an adsorption mark is less likely to be made on the separator sheet.

DETAILED DESCRIPTION

Hereinafter, a preferred embodiment related to a method and an apparatus for manufacturing a laminated electrode body disclosed herein will be described in detail while referring to the drawings when appropriate. With the exception of matters specifically mentioned in the present specification, matters required to carry out the present disclosure can be understood to be design matters of a person with ordinary skill in the art based on the prior art in the relevant technical field. The present disclosure can be carried out on the basis of the contents disclosed in the present specification and common general technical knowledge in the relevant field. However, the embodiment described below is not intended to limit the technique disclosed herein. In addition, in the drawings shown in the present specification, members and portions that produce the same effects will be described using the same reference characters. Furthermore, dimensional relationships (a length, a width, a thickness, and the like) shown in the respective drawings do not reflect actual dimensional relationships.

It should be noted that, in the present specification and the scope of claims, a prescribed numerical value range described as A to B (where A and B are any numerical values) means A or more and B or less. Therefore, A to B includes cases of more than A and less than B.

First, a configuration of a battery 100 including a typical laminated electrode body 80 manufactured by a laminated electrode body manufacturing apparatus 1 according to the present embodiment will be briefly described with reference to FIG. 8. While a case where an outer package made of a laminated film is used as an outer package 70 will be described as an example below, the example is not intended to limit a type of the outer package to laminated films. For example, the outer package may be a metallic battery case with a hexahedral shape.

Overall Configuration of Battery

Figure 8:
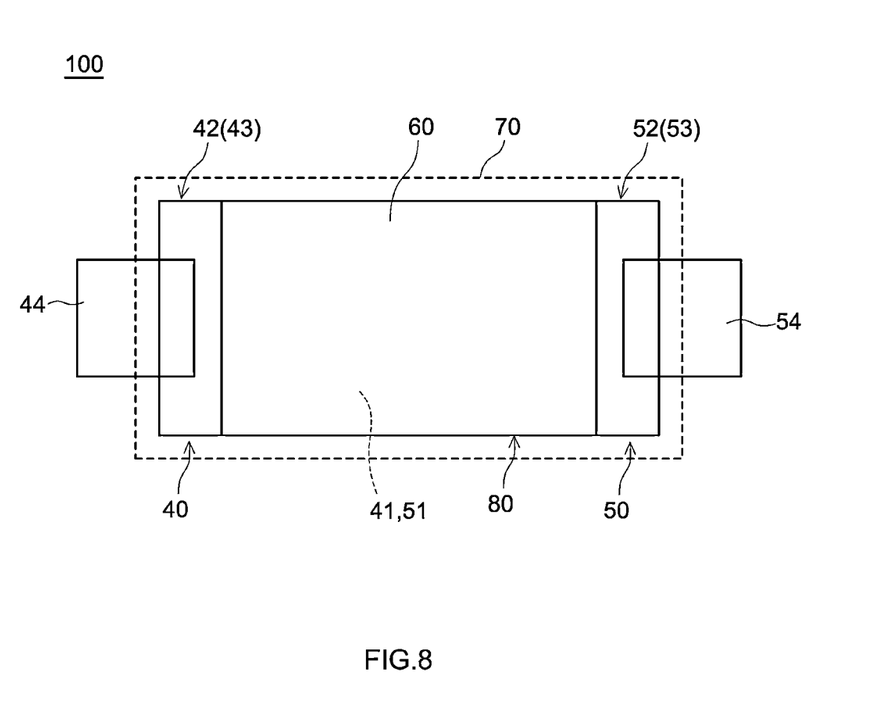
FIG. 8 is a plan view schematically showing a configuration of a battery including the laminated electrode body according to the embodiment.

FIG. 8 is a plan view schematically showing a configuration of the battery 100 including the laminated electrode body 80 according to an embodiment. As shown in FIG. 8, roughly speaking, the battery 100 includes the laminated electrode body 80 and the outer package 70 housing the electrode body. The outer package 70 housing the laminated electrode body 80 is formed by arranging the laminated electrode body 80 between a pair of laminated films and forming a welded portion (not illustrated) by welding outer peripheral edge portions of the laminated films.

Although a detailed illustration will be omitted, the laminated electrode body 80 according to the present embodiment is formed by having a positive electrode sheet 40 and a negative electrode sheet 50 (hereinafter, also collectively referred to as an "electrode sheet") with rectangular shapes being laminated in plurality via a separator sheet 60 with a same rectangular shape. The electrode sheet includes a current collector (a positive electrode current collector 42 or a negative electrode current collector 52) which is a foilshaped metal member and an electrode active material layer (a positive electrode active material layer 41 or a negative electrode active material layer 51) formed on a surface (one surface or both surfaces) of the current collector.

In the electrode sheet with a rectangular shape according to the present embodiment, an active material layer unformed portion (a positive electrode active material layer unformed portion 43 or a negative electrode active material layer unformed portion 53) in which the electrode active material layer is not formed and the current collector is exposed is formed at one side edge portion in a long-side direction. In addition, the laminated electrode body 80 is formed by stacking each electrode sheet so that the positive electrode active material layer unformed portion 43 protrudes from one of the side edge portions and the negative electrode active material layer unformed portion 53 protrudes from the other side edge portion. A core portion in which the electrode active material layers of the electrode sheets are laminated is formed in a center portion in the long-side direction of the laminated electrode body. Furthermore, a positive electrode terminal connecting portion in which the positive electrode active material layer unformed portion 43 is stacked in plurality is formed in one of the side edge portions in the long-side direction and a negative electrode terminal connecting portion in which the negative electrode active material layer unformed portion 53 is stacked in plurality is formed in the other side edge portion. A positive electrode collector terminal 44 is connected to the positive electrode collector terminal connecting portion and a negative electrode collector terminal 54 is connected to the negative electrode collector terminal connecting portion.

For example, the battery 100 including the laminated electrode body 80 manufactured by the manufacturing method of a laminated electrode body according to the present embodiment may be a nonaqueous electrolyte secondary battery or an all solid-state battery. In the case of a nonaqueous electrolyte secondary battery, the laminated electrode body 80 in which an insulating separator sheet 60 is inserted between electrode sheets is used and, at the same time, a nonaqueous electrolytic solution is housed inside the outer package 70. On the other hand, in the case of an all solid-state battery, the laminated electrode body 80 in which a solid electrolyte layer (which corresponds to the separator sheet 60) is inserted between the electrode sheets is used. It should be noted that, as these members (specifically, the electrode sheets, the separator sheet, the solid electrolyte layer, the nonaqueous electrolytic solution, and the like), members usable in secondary batteries of this type can be used without any particular limitations.

Next, a preferred embodiment of each of the first to third manufacturing methods disclosed herein will be described together with the laminated electrode body manufacturing apparatus 1 which embodies the manufacturing method of a laminated electrode body.

Figure 1:
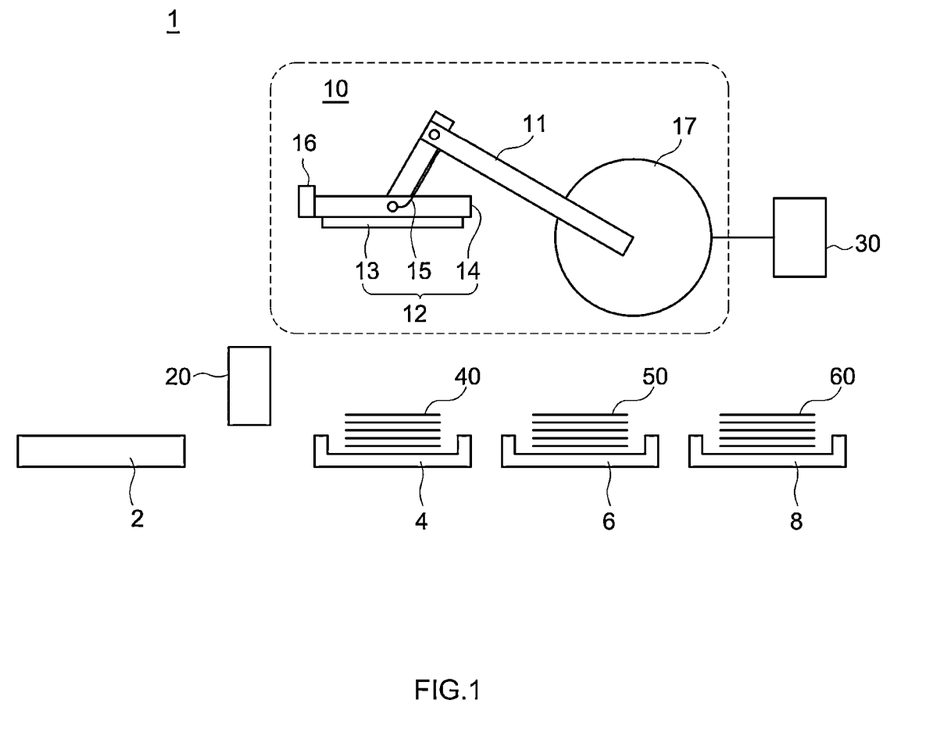
FIG. 1 is a block diagram schematically showing main components of a laminated electrode body manufacturing apparatus according to an embodiment.

FIG. 1 is a block diagram schematically showing main components of the laminated electrode body manufacturing apparatus 1 according to an embodiment. As shown in FIG. 1, roughly speaking, the laminated electrode body manufacturing apparatus 1 includes a laminating table 2, sheet housing portions (a positive electrode sheet housing portion 4, a negative electrode sheet housing portion 6, and a separator sheet housing portion 8), transporting means 10, an inspection camera 20 (which corresponds to the inspecting portion), and a control portion 30. Hereinafter, each component will be described in detail.

Laminating Table 2

The laminating table 2 according to the present embodiment is a table on which the positive electrode sheet 40, the negative electrode sheet 50, and the separator sheet 60 are to be laminated. The laminating table 2 has a rectangular shape in a plan view and at least has a size that enables the positive electrode sheet 40, the negative electrode sheet 50, and the separator sheet 60 to be arranged thereon. A configuration (for example, constituent materials) of the laminating table 2 is not particularly limited insofar as the techniques disclosed herein can be implemented. In addition, although not illustrated, on the laminating table 2, the positive electrode active material layer unformed portion 43 of the positive electrode sheet 40 and the negative electrode active material layer unformed portion 53 of the negative electrode sheet 50 are laminated via the separator sheet 60 so as to protrude in opposite directions.

Sheet Housing Portions

The laminated electrode body manufacturing apparatus 1 according to the present embodiment includes the positive electrode sheet housing portion 4, the negative electrode sheet housing portion 6, and the separator sheet housing portion 8. The positive electrode sheet housing portion 4 houses the positive electrode sheet 40 being laminated in plurality in a state where the positive electrode active material layer unformed portions 43 are aligned in a same direction. The negative electrode sheet housing portion 6 houses the negative electrode sheet 50 being laminated in plurality in a state where the negative electrode active material layer unformed portions 53 are aligned in a same direction. In addition, the separator sheet housing portion 8 houses the separator sheet 60 being laminated in plurality.

Transporting Means 10

The transporting means 10 according to the present embodiment is means which transports the positive electrode sheet 40, the negative electrode sheet 50, and the separator sheet 60 to the laminating table 2. As shown in FIG. 1, roughly speaking, the transporting means 10 according to the present embodiment is constituted of an arm portion 11, an adsorbing portion 12 provided at a tip of the arm portion, and a base portion 17 which supports the arm portion 11 and the adsorbing portion 12. By operating the arm portion 11, the adsorbing portion 12 can be moved to a desired position. In addition, as the arm portion 11 and the base portion 17, members usable for this application can be used without any particular limitations.

The adsorbing portion 12 according to the present embodiment includes an adsorption plate 13, an adsorption base 14, and a suction tube 15. The adsorption plate 13 is a portion which adsorbs the positive electrode sheet 40, the negative electrode sheet 50, and the separator sheet 60. While a configuration of the adsorption plate is not particularly limited insofar as the techniques disclosed herein can be implemented, for example, an adsorption plate made of a porous body (in other words, a porous adsorption plate) or a multi-pore adsorption plate with artificially opened pores can be used. Among these materials, a porous adsorption plate can be favorably used from the perspective of preventing adsorption marks from being made on the separator sheet 60. The adsorption plate 13 is installed on the adsorption base 14.

In addition, as shown in FIG. 1, the suction tube 15 is installed outside the adsorbing portion 12. Another end of the suction tube is connected to a vacuum pump (not illustrated) of which on/off states are controlled by the control portion 30 to be described later. Accordingly, adsorption and adsorption release of sheets by the adsorption plate 13 are controlled.

Furthermore, as shown in FIG. 1, a control camera 16 is provided at a tip of the adsorbing portion 12 according to the present embodiment. The control camera is used to photograph an entirety or a part of an object to be adsorbed (in this case, the positive electrode sheet 40, the negative electrode sheet 50, and the separator sheet 60). In addition, acquired image data is transmitted to the control portion 30 to be described later from a transmission source (not illustrated) to be utilized in position adjustment of the adsorbing portion 12 or the like to be described later. It should be noted that the transmission source may be provided in the control camera 16 or may be present in a portion other than the control camera.

Inspection Camera 20

In the inspection camera 20 according to the present embodiment, relative lamination position information of the separator sheet 60 and the positive electrode sheet 40 (or the negative electrode sheet 50) in a state of being adsorbed by the adsorption plate 13 is acquired as image data from a direction opposing a surface of the adsorption plate. Image data obtained by the camera is preferable because the relative lamination position information can be acquired in a state of higher accuracy. The image data may be image data of an entire surface of the adsorption plate 13 or image data of a part of the surface of the adsorption plate 13.

The acquired image data is transmitted to the control portion 30 to be described later from a transmission source (not illustrated) to be utilized in an inspection for determining whether or not the separator sheet 60 and the positive electrode sheet 40 (or the negative electrode sheet 50) in a state of being adsorbed to the surface of the adsorption plate 13 to be described later are to be arranged on the laminating table 2 and the like. It should be noted that the transmission source may be provided in the inspection camera 20 or may be present in a portion other than the inspection camera.

Control Portion 30

The control portion 30 according to the present embodiment controls the inspection camera 20 and the transporting means 10 (the control camera 16). In a similar manner to general control units, the control portion 30 is constituted of an arithmetic portion (a CPU), a storage portion (a memory), an input portion, an output portion, and the like. Various programs for executing the manufacturing method of a laminated electrode body according to the present embodiment are stored in the storage portion, and the manufacturing method of a laminated electrode body according to the present embodiment is executed as the arithmetic portion reads and executes the programs. Since a configuration of the control portion 30 itself does not characterize the present disclosure, a detailed description thereof will be omitted. Hereinafter, a preferred embodiment of each of the first to third manufacturing methods disclosed herein will be described together with procedures (FIG. 2, FIG. 3, FIG. 6, and FIG. 7) to be executed by the control portion 30.

First Manufacturing Method

Figure 2:
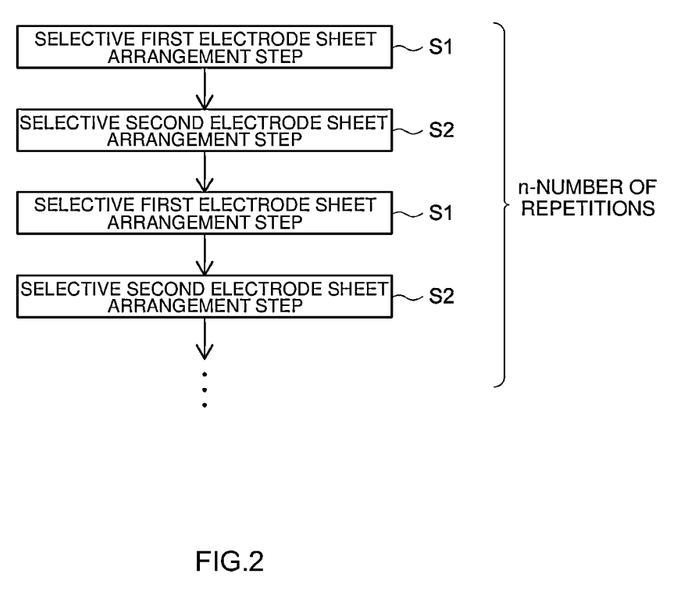
FIG. 2 is a rough process chart for explaining a first manufacturing method according to the embodiment.
Figure 3:
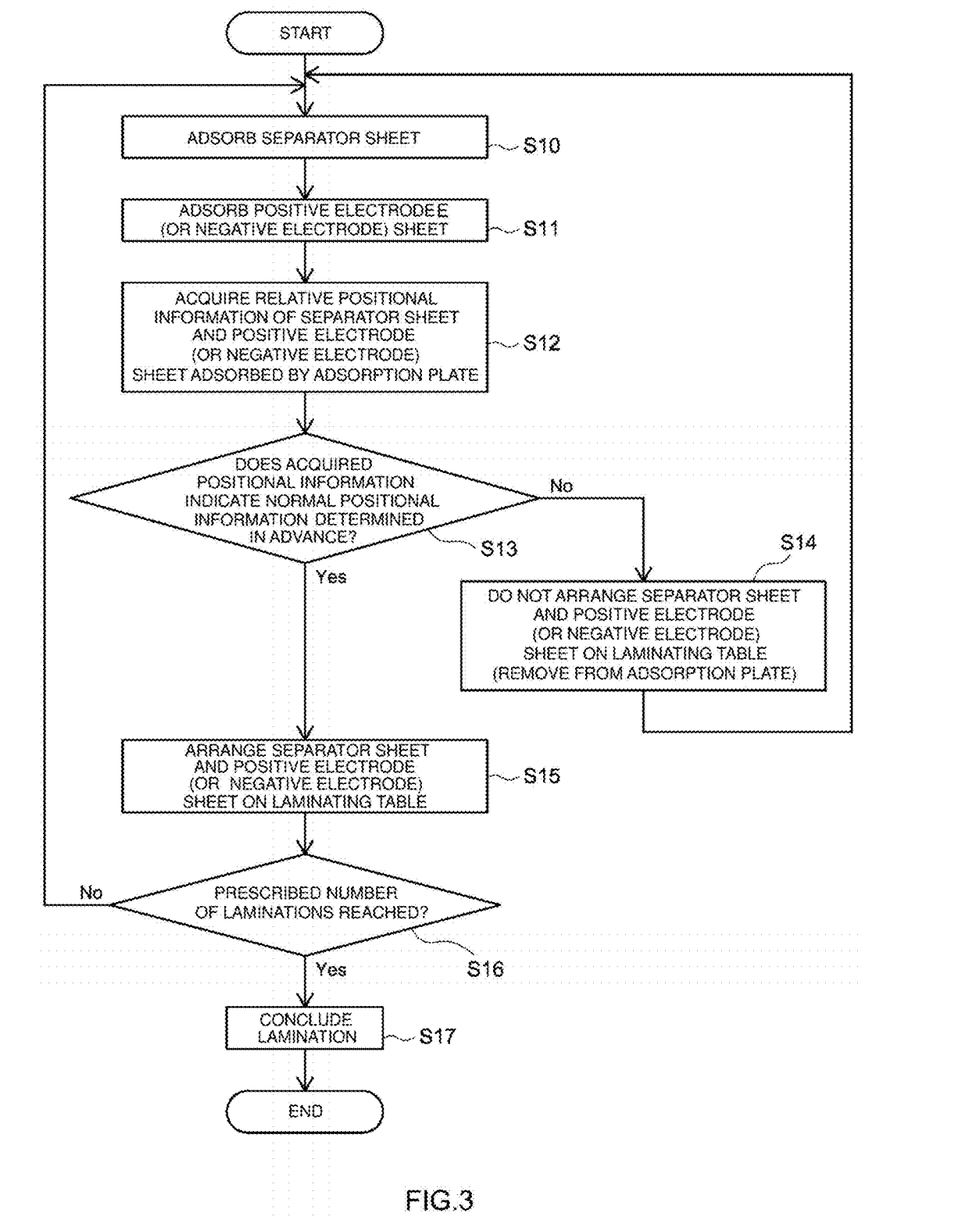
FIG. 3 is a control flow chart for explaining the first manufacturing method according to the embodiment.

FIG. 2 is a rough process chart for explaining the first manufacturing method according to an embodiment. As shown in FIG. 2, roughly speaking, the first manufacturing method according to the embodiment alternately repetitively performs a selective first electrode sheet arrangement step (step S1) and a selective second electrode sheet arrangement step (step S2) until the number of laminations of the positive electrode sheet 40 and the negative electrode sheet 50 determined in advance is reached. In addition, FIG. 3 is a control flow chart for more specifically explaining FIG. 2. In this case, step Si and step S2 described above can be steps that include steps S10 to S15 shown in FIG. 3. Hereinafter, a case where the first electrode sheet is the positive electrode sheet 40 and the second electrode sheet is the negative electrode sheet 50 will be described with reference to FIG. 3.

As shown in FIG. 3, in the first manufacturing method according to the embodiment, first, the separator sheet 60 is caused to be adsorbed at a prescribed position on a surface of the adsorption plate 13 (step S10). In addition, the positive electrode sheet 40 is caused to be adsorbed at a prescribed position on a surface of the separator sheet 60 having been adsorbed by the adsorption plate 13 (step S11).

Figure 4A:
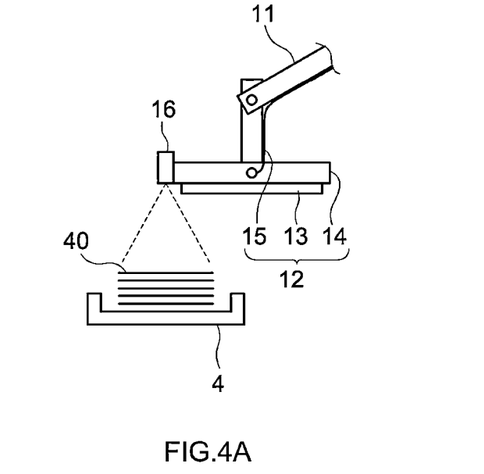
FIG. 4A is a schematic view for explaining an aspect of acquiring adsorption position information of a positive electrode sheet prior to adsorption in order to cause the positive electrode sheet to be adsorbed at a prescribed position on a surface of a separator sheet in a state of being adsorbed by an adsorption plate in the first manufacturing method according to the embodiment.

In step S11 described above, as shown in FIG. 4A, an entire image of the positive electrode sheet 40 present on an outermost surface among the positive electrode sheets 40 being housed in the positive electrode sheet housing portion 4 is photographed by the control camera 16. In addition, acquired image data is transmitted from a transmission source (not illustrated) and received by the control portion 30.

Figure 4B:
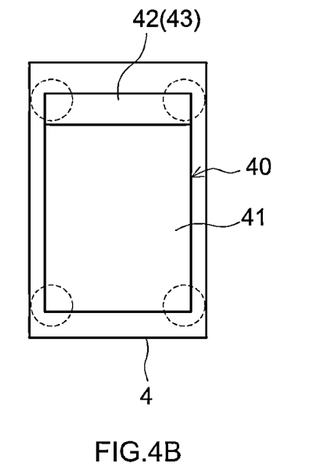
FIG. 4B is a plan view schematically showing an aspect of acquiring positional information of four corners of the positive electrode sheet prior to the adsorption as the adsorption position information in the first manufacturing method according to the embodiment.

Subsequently, positions (refer to FIG. 4B) of four corners of the positive electrode sheet 40 in the acquired image data are collated with positions of the four corners of the positive electrode sheet 40 in image data stored in the control portion 30 in advance. In this case, the positions of the four corners of the positive electrode sheet 40 in the stored image data refer to positions of the four corners of the positive electrode sheet 40 in image data that can be acquired by the control camera 16 included in the adsorbing portion 12 in a case where the adsorbing portion is at an appropriate position when being moved in order to adsorb the positive electrode sheet 40. Furthermore, when a deviation has occurred between the acquired positions of the four corners of the positive electrode sheet 40 and the positions of the four corners of the positive electrode sheet 40 stored in advance, the deviation is interpreted as an amount of movement of an x-axis coordinate and a y-axis coordinate and the adsorbing portion 12 is moved by the amount of movement. In this manner, by appropriately adjusting the position of the adsorbing portion 12 before adsorbing the positive electrode sheet 40, the positive electrode sheet 40 can be caused to be adsorbed with high accuracy at a desired position on the surface of the separator sheet 60 being adsorbed by the adsorption plate.

Next, relative lamination position information of the separator sheet 60 and the positive electrode sheet 40 in a state of being adsorbed by the adsorption plate 13 is acquired from a direction opposing the surface of the adsorption plate (step S12). In addition, an inspection is performed to determine whether or not the lamination position information acquired in step S12 described above indicates a normal positional relationship determined in advance (step S13).

Figure 5A:
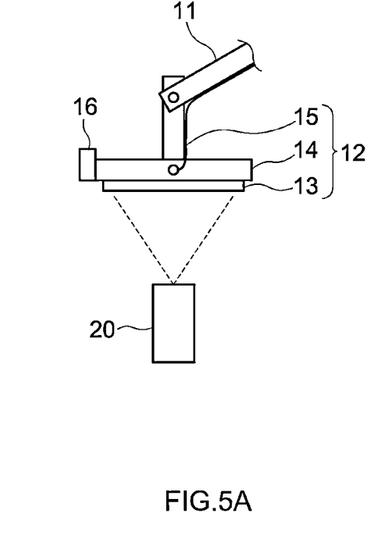
FIG. 5A is a schematic view for explaining an aspect of acquiring lamination position information of a separator sheet and a positive electrode sheet in a state of being adsorbed by an adsorption plate from a direction opposing a surface of the adsorption plate in the first manufacturing method according to the embodiment.

In step S12 described above, as shown in FIG. 5A, image data of the separator sheet 60 and the positive electrode sheet 40 in a state of being adsorbed by the surface of the adsorption plate 13 is acquired by the inspection camera 20 from a direction opposing the surface of the adsorption plate. Furthermore, acquired image data is transmitted from a transmission source (not illustrated) and received by the control portion 30.

Figure 5B:
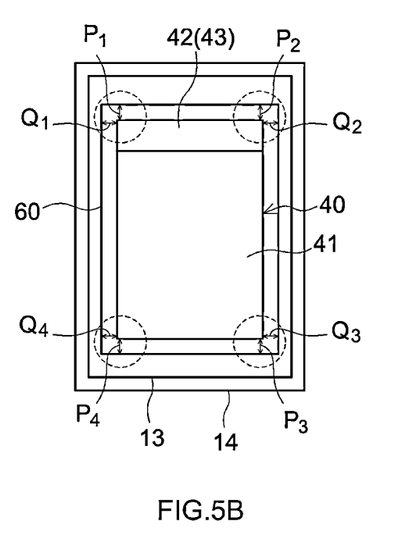
FIG. 5B is a plan view schematically showing an aspect of the surface of the adsorption plate in the first manufacturing method according to the embodiment.

In addition, in step S13 described above, as shown in FIG. 5B, clearances of four corners of the separator sheet 60 and four corners of the positive electrode sheet 40 in the acquired image data described above (in other words, portions $P_1$ to $P_4$ and portions $Q_1$ to $Q_4$ in FIG. 5B) are collated with clearances of four corners of the separator sheet 60 and four corners of the positive electrode sheet 40 stored in advance in the control portion 30. In this case, the clearances of the four corners of the separator sheet 60 and the four corners of the positive electrode sheet 40 in image data stored in advance refer to clearances of the respective four corners in image data that can be acquired by the inspection camera 20 when the separator sheet 60 and the positive electrode sheet 40 in a state of being adsorbed by the adsorption plate 13 are present at appropriate positions. Furthermore, the portions $P_1$ to $P_4$ and the portions $Q_1$ to $Q_4$ in FIG. 5B can be calculated using methods such as making full use of various algorithms.

When the clearances of the four corners in the acquired image are within an acceptable error as compared to the clearances of the four corners stored in advance, it is determined that the relative positional relationship between the separator sheet 60 and the positive electrode sheet 40 in a state of being adsorbed by the adsorption plate 13 indicates a normal positional relationship. On the other hand, when the clearances of the four corners in the acquired image are outside of the acceptable error as compared to the clearances of the four corners stored in advance, it is determined that the relative positional relationship between the separator sheet 60 and the positive electrode sheet 40 in a state of being adsorbed by the adsorption plate 13 does not indicate a normal positional relationship. It should be noted that the acceptable error described above can be set to, for example, ±0.6 mm to ±1.1 mm or the like when a planar size of the separator sheet 60 is 305 mm×425 mm and a planar size of the positive electrode sheet 40 is 300 mm×420 mm (a similar range can be adopted as an acceptable error with respect to distances described in (vi) below).

In step S13 described above, when it is determined that the separator sheet 60 and the positive electrode sheet 40 in a state of being adsorbed by the adsorption plate 13 indicates a normal positional relationship determined in advance, the separator sheet and the positive electrode sheet in a state of being adsorbed by the adsorption plate are arranged on the laminating table 2 (step S15).

On the other hand, when it is determined in step S13 described above that the separator sheet 60 and the positive electrode sheet 40 in a state of being adsorbed by the adsorption plate 13 do not indicate a normal positional relationship determined in advance, the separator sheet and the positive electrode sheet in a state of being adsorbed by the adsorption plate are removed from the adsorption plate without being arranged on the laminating table 2 (step S14) and a return is made to step S10. The sheets removed from the adsorption plate 13 may be discarded as it is or reused for lamination from the perspective of reducing cost or the like. The operation described above is repetitively performed until step S15 is reached.

Subsequently, when step S15 described above is reached, it is confirmed whether or not the number of laminations of the positive electrode sheet 40 and the negative electrode sheet 50 reaches the number of laminations determined in advance (step S16). When the number of laminations is reached, lamination is concluded (step S17), but when the number of laminations is not reached, a return is made to step S10 once again. When returning to step S10 once again after arranging the separator sheet 60 and the positive electrode sheet 40, operations of steps S10 to S15 are performed only this time with respect to the negative electrode sheet 50 in place of the positive electrode sheet 40. Accordingly, the separator sheet 60 and the negative electrode sheet 50 are arranged. A laminate can be manufactured by repetitively performing the operations described above until step S17 is reached.

It should be noted that since the positive electrode sheet 40 is directly present in a bottommost portion (in other words, a portion in contact with the laminating table 2) of the laminate manufactured in the first manufacturing method according to the embodiment, the separator sheet 60 may be further arranged in the bottommost portion of the laminate. In addition, envisaging that the laminate is to be housed in an outer package inside which an insulating sheet has been added in advance, the positive electrode sheet 40 or the negative electrode sheet 50 may be further arranged in a topmost portion of the laminate. Furthermore, the battery 100 including the laminated electrode body 80 can be obtained through conventional and known battery manufacturing methods.

Second Manufacturing Method

Figure 6:
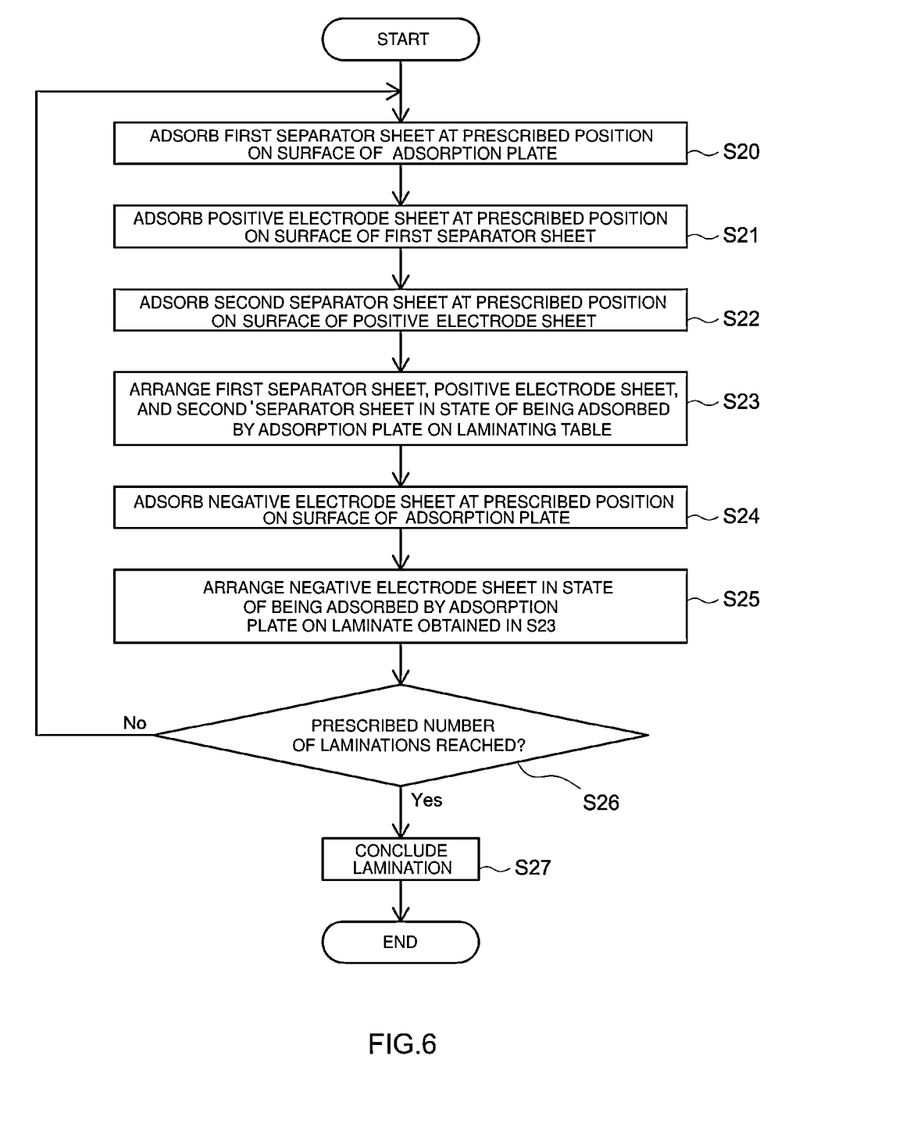
FIG. 6 is a control flow chart for explaining a second manufacturing method according to the embodiment.

FIG. 6 is a control flow chart for explaining a second manufacturing method according to an embodiment. Hereinafter, a case where the first electrode sheet is the positive electrode sheet 40 and the second electrode sheet is the negative electrode sheet 50 will be described with reference to FIG. 6.

As shown in FIG. 6, in the second manufacturing method according to the embodiment, first, the separator sheet 60 (which corresponds to the first separator sheet) is caused to be adsorbed at a prescribed position on a surface of the adsorption plate 13 (step S20). In addition, the positive electrode sheet 40 is caused to be adsorbed at a prescribed position on a surface of the separator sheet 60 having been adsorbed by the adsorption plate 13 (step S21). Subsequently, the separator sheet 60 (which corresponds to the second separator sheet) is caused to be adsorbed at a prescribed position on a surface of the positive electrode sheet 40 having been adsorbed in step S21 (step S22). In addition, the first separator sheet, the positive electrode sheet, and the second separator sheet in a state of being adsorbed by the adsorption plate 13 are arranged on the laminating table 2 (step S23). Next, the negative electrode sheet 50 is caused to be adsorbed at a prescribed position on a surface of the adsorption plate 13 (step S24). In addition, the negative electrode sheet 50 in a state of being adsorbed by the adsorption plate 13 is laminated on top of the laminate obtained in step S23 (step S25).

While a method of causing a prescribed sheet to be adsorbed at a prescribed position of the adsorption plate 13 or each sheet in steps S20 to S22 and S24 described above is not particularly limited insofar as an effect of the techniques disclosed herein is exhibited, for example, a method based on step S11 described above can be used.

When step S25 described above is reached, it is confirmed whether or not the number of laminations of the positive electrode sheet 40 and the negative electrode sheet 50 reaches the number of laminations determined in advance (step S26). When the number of laminations is reached, lamination is concluded (step S27), but when the number of laminations is not reached, a return is made to step S20 once again. A laminate can be manufactured by repetitively performing the operations until step S27 is reached. For example, the laminate fabricated as described above may be housed inside an outer package as it is. Furthermore, the battery 100 including the laminated electrode body 80 can be obtained through conventional and known battery manufacturing methods.

Third Manufacturing Method

Figure 7:
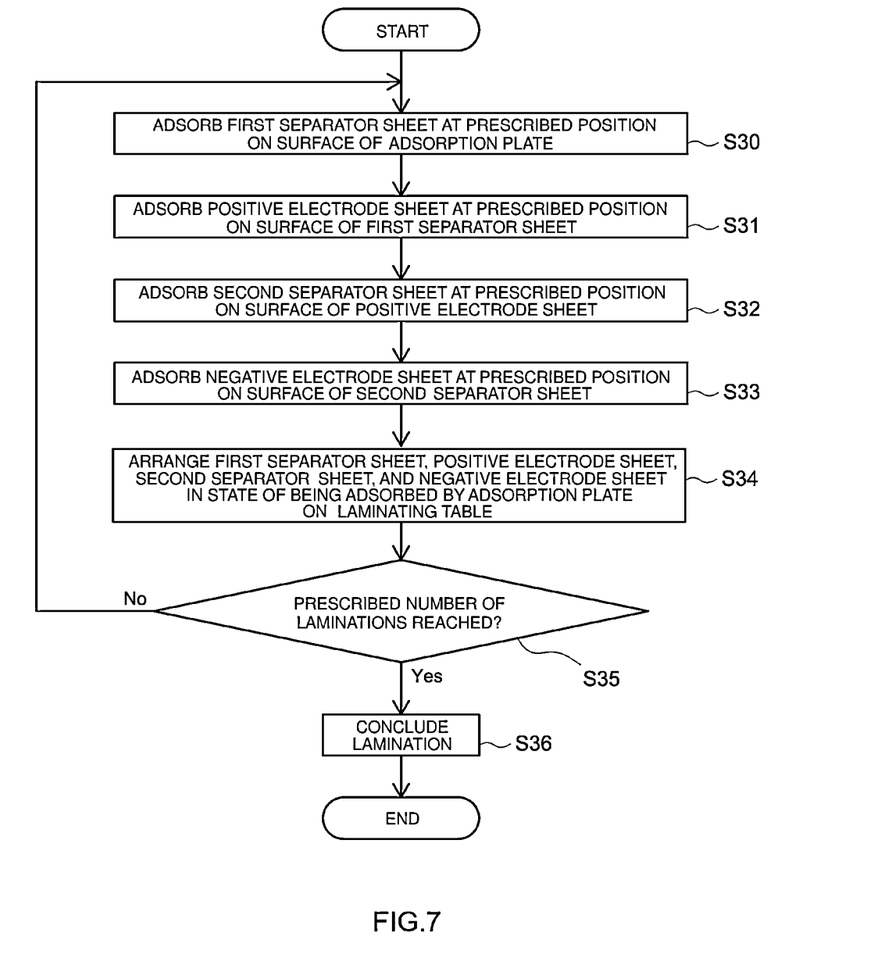
FIG. 7 is a control flow chart for explaining a third manufacturing method according to the embodiment.

FIG. 7 is a control flow chart for explaining a third manufacturing method according to an embodiment. Hereinafter, a case where the first electrode sheet is the positive electrode sheet 40 and the second electrode sheet is the negative electrode sheet 50 will be described with reference to FIG. 7.

As shown in FIG. 7, in the third manufacturing method according to the embodiment, first, the separator sheet 60 (which corresponds to the first separator sheet) is caused to be adsorbed at a prescribed position on a surface of the adsorption plate 13 (step S30). In addition, the positive electrode sheet 40 is caused to be adsorbed at a prescribed position on a surface of the first separator sheet having been adsorbed by the adsorption plate 13 (step S31). Subsequently, the separator sheet 60 (which corresponds to the second separator sheet) is caused to be adsorbed at a prescribed position on a surface of the positive electrode sheet 40 having been adsorbed in step S31 (step S32). In addition, the negative electrode sheet 50 is caused to be adsorbed at a prescribed position on a surface of the second separator sheet having been adsorbed in step S32 (step S33). Next, the first separator sheet, the positive electrode sheet 40, the second separator sheet, and the negative electrode sheet 50 in a state of being adsorbed by the adsorption plate 13 are arranged on the laminating table 2 (step S34).

While a method of causing a prescribed sheet to be adsorbed at a prescribed position of the adsorption plate 13 or each sheet in steps S30 to S33 described above is not particularly limited insofar as an effect of the techniques disclosed herein is exhibited, for example, a method based on step S11 described above can be used.

When step S34 described above is reached, it is confirmed whether or not the number of laminations of the positive electrode sheet 40 and the negative electrode sheet 50 reaches the number of laminations determined in advance (step S35). When the number of laminations is reached, lamination is concluded (step S36), but when the number of laminations is not reached, a return is made to step S30 once again. A laminate can be manufactured by repetitively performing the operations until step S36 is reached.

It should be noted that since the negative electrode sheet 50 is directly present in a bottommost portion (in other words, a portion in contact with the laminating table 2) of the laminate manufactured in the third manufacturing method according to the embodiment, the separator sheet 60 may be further arranged in the bottommost portion of the laminate. In addition, envisaging that the laminate is to be housed in an outer package inside which an insulating sheet has been added in advance, the positive electrode sheet 40 or the negative electrode sheet 50 may be further arranged in a topmost portion of the laminate. Furthermore, the battery 100 including the laminated electrode body 80 can be obtained through conventional and known battery manufacturing methods.

Modifications

While specific examples of the manufacturing method of a laminated electrode body disclosed herein (a preferred embodiment of each of the first to third manufacturing methods disclosed herein) have been described in detail above with reference to the laminated electrode body manufacturing apparatus 1 and FIG. 2, FIG. 3, FIG. 6, and FIG. 7, contents of the manufacturing method of a laminated electrode body disclosed herein are not limited to the specific examples. The manufacturing method of a laminated electrode body disclosed herein includes various modifications of the specific examples described above insofar as objects thereof remain unchanged. Examples of such modifications will be explained in (i) to (vi) below.

(i) While the first electrode sheet is explained to be the positive electrode sheet 40 and the second electrode sheet is explained to be the negative electrode sheet 50 in the embodiments described above, the first electrode sheet can be the negative electrode sheet 50 and the second electrode sheet can be the positive electrode sheet 40.

(ii) While sheets with rectangular shapes are used as the positive electrode sheet 40, the negative electrode sheet 50, and the separator sheet 60 in the embodiments described above, the sheets may include a sheet of which four corners have been rounded or the like. However, in this case, inspections that do not use four corners must be performed in steps S11 and S13 described above. Inspections that do not use four corners can be appropriately selected from those exemplified in (iv), (vi), and the like described below.

(iii) While the laminating table 2 with a rectangular shape in a plan view is used in the embodiments described above, for example, a laminating table with a circular shape, a trapezoidal shape, or the like in a plan view can also be used.

(iv) In the embodiments described above, an entire image of a positive electrode (negative electrode) sheet present on an outermost surface among the positive electrode (negative electrode) sheets being housed in the housing portion is photographed and positions of four corners of the positive electrode (negative electrode) sheet are collated with positions of four corners of a positive electrode (negative electrode) sheet in image data stored in advance in the control portion 30. However, the collation is not limited thereto and, for example, a position or positions of one prescribed corner, two prescribed corners, or three prescribed corners of the respective positive electrode (negative electrode) sheets may be collated. Alternatively, a position or positions of one prescribed side, two prescribed sides, three prescribed sides, or four prescribed sides, a position of a diagonal (one or two), a position of an intersection of diagonals, or the like of the respective positive electrode (negative electrode) sheets may be collated. Furthermore, from the perspective of improving inspection accuracy, two or more of the methods described above may be used in combination.

(v) While the inspection camera 20 is adopted as the inspecting portion in the embodiments described above (specifically, the first manufacturing method according to an embodiment), a device that receives ultrasonic waves, a device that receives lasers, or the like may be used in place of the inspection camera. It should be noted that, when using a device that receives ultrasonic waves, a device that transmits ultrasonic waves with respect to an object must be provided inside or outside of the device. In addition, when using a device that receives lasers, a device that transmits a laser with respect to an object must be provided inside or outside of the device.

(vi) In the embodiments described above (specifically, the first manufacturing method according to an embodiment), in step S12, clearances of four corners of the separator sheet 60 and four corners of the positive electrode (negative electrode) sheet in a state of being adsorbed by the adsorption plate 13 are collated with clearances of four corners of the separator sheet 60 and four corners of the positive electrode (negative electrode) sheet in image data stored in advance in the control portion 30. However, the collation is not limited thereto and, for example, positions of two prescribed corners or three prescribed corners of the separator sheet 60 and the positive electrode (negative electrode) sheet may be collated. Alternatively, shortest distances between two prescribed corners, three prescribed corners, or four prescribed corners of the separator sheet 60 and the positive electrode (negative electrode) sheet, distances between four sides of the separator sheet 60 and four sides (or one prescribed side, two prescribed sides, or three prescribed sides) of the positive electrode (negative electrode), a relative positional relationship between an intersection of diagonals of the separator sheet 60 and an intersection of diagonals of the positive electrode (negative electrode) sheet, or the like may be collated.

The invention claimed is:

1. A manufacturing method of a laminated electrode body in which a positive electrode sheet and a negative electrode sheet are laminated in plurality via a separator sheet, the manufacturing method comprising:
 a selective first electrode sheet arrangement step performed by a manufacturing apparatus comprising an inspection camera, an adsorption plate, and a control unit including a CPU, a memory, an input, and an output, the selective first electrode sheet arrangement step including:
  separator adsorption processing of causing only a single separator sheet to be adsorbed at a prescribed position on a surface of the adsorption plate;
  first electrode sheet adsorption processing of causing only a single first electrode sheet made of any of the positive/negative electrode sheets to be adsorbed at a prescribed position on a surface of the adsorbed single separator sheet while the single separator sheet remains in a state of being adsorbed at the prescribed position on the surface of the adsorption plate;
  electrode adsorption position inspection processing, by the control unit, of acquiring, from a direction opposing the surface of the adsorption plate, relative positional information of the adsorbed single separator sheet and the adsorbed single first electrode sheet in a state of being adsorbed by the adsorption plate based on a surface image of the adsorption plate photographed by the inspection camera arranged in the direction opposing the surface of the adsorption plate, and inspecting whether the acquired relative positional information indicates a predetermined normal positional relationship by the control unit; and
  first electrode sheet selection processing of
   transporting the adsorbed single separator sheet and the adsorbed single first electrode sheet in a state of being adsorbed by the adsorption plate to a prescribed laminating table and arranging on the table by using the manufacturing apparatus in response to the control unit indicating the predetermined normal positional relationship in the electrode adsorption position inspection processing, and
   not arranging the adsorbed single separator sheet and the adsorbed single first electrode sheet in the state of being adsorbed by the adsorption plate on the prescribed laminating table in response to the control unit not indicating the predetermined normal positional relationship in the electrode adsorption position inspection processing, and
 a selective second electrode sheet arrangement step of performing each processing step of the selective first electrode sheet arrangement step with respect to the single separator sheet and a single second electrode sheet, which is a counter electrode of the first electrode sheet, wherein:
 the selective first electrode sheet arrangement step and the selective second electrode sheet arrangement step are alternately repetitively performed until the number of laminations determined in advance of the positive/negative electrode sheets is reached.

2. The manufacturing method according to claim 1, wherein:
 the first electrode sheet, the second electrode sheet, and the separator sheet all have rectangular shapes, and
 in the electrode adsorption position inspection processing, relative positional information between four corners of the adsorbed single separator sheet in a state of being adsorbed on the adsorption plate and four corners of the adsorbed single first electrode sheet or the adsorbed single second electrode sheet in a state of being adsorbed on the adsorption plate is acquired by the inspection camera.

3. The manufacturing method according to claim 1, wherein:
 the adsorption plate is a porous adsorption plate.

* * * * *